(12) United States Patent
Takagi (10) Patent No.: US 6,906,707 B2
(45) Date of Patent: Jun. 14, 2005

(54) IMAGE PROCESSING APPARATUS AND METHOD

(75) Inventor: Yoshihiro Takagi, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 244 days.

(21) Appl. No.: 09/789,641

(22) Filed: Feb. 22, 2001

(65) Prior Publication Data

US 2001/0026281 A1 Oct. 4, 2001

(30) Foreign Application Priority Data

Feb. 24, 2000 (JP) .......................................... 2000-048150
Sep. 11, 2000 (JP) .......................................... 2000-275484

(51) Int. Cl.[7] ........................... G09G 5/00; G06T 11/00; G06K 9/00
(52) U.S. Cl. ....................... 345/418; 345/592; 345/619; 345/629; 345/467; 358/1.9; 358/2.1; 358/462; 382/162
(58) Field of Search ................................. 345/418–421, 345/581, 589, 592–593, 594, 597, 619, 624, 629, 620, 441, 443, 467–468, 469–471, 426, 582; 358/1.1, 1.9, 2.1, 500, 530, 538, 540, 443, 453, 448, 462, 464; 382/162, 164, 165, 173, 254, 134–136, 290–292; 715/582, 526, 527–528

(56) References Cited

U.S. PATENT DOCUMENTS

| | | | | |
|---|---|---|---|---|
| 5,581,667 A | * | 12/1996 | Bloomberg | 358/1.9 |
| 5,588,093 A | * | 12/1996 | Harrington | 358/1.9 |
| 5,765,874 A | * | 6/1998 | Chanenson et al. | 283/67 |
| 5,767,978 A | * | 6/1998 | Revankar et al. | 358/296 |
| 5,923,821 A | | 7/1999 | Birnbaum et al. | 395/109 |
| 5,966,462 A | * | 10/1999 | Linder et al. | 382/173 |
| 6,415,303 B1 | * | 7/2002 | Meier et al. | 715/500.1 |
| 6,496,275 B1 | * | 12/2002 | Kurashina et al. | 358/1.11 |
| 6,512,522 B1 | * | 1/2003 | Miller et al. | 345/474 |

FOREIGN PATENT DOCUMENTS

| | | |
|---|---|---|
| EP | 0 674 277 | 9/1995 |
| EP | 0 902 390 | 3/1999 |
| JP | 9-240080 | 9/1997 |
| JP | 2000-148973 | 5/2000 |
| WO | 00/77723 | 12/2000 |

OTHER PUBLICATIONS

Search Report, dated Jul. 5, 2004, in EP 01 30 1683.
Kamata, Junko, "Using 'T–Time' to Connect the Internet to the Electronic Library", Medicine and Computers, vol. 10, No. 3, Mar. 20, 1999, pp. 78–84, in Japanese (and translation).
Japanese Office Action dated Jun. 21, 2002 of the basic Japanese Patent Application No. 2000–048150 (and translation).

* cited by examiner

*Primary Examiner*—Matthew C. Bella
*Assistant Examiner*—Wesner Sajous
(74) *Attorney, Agent, or Firm*—Fitzpatrick, Cella, Harper & Scinto (57) ABSTRACT

A character background color is rendered based on a text command. In such case, if all text commands are rendered as text objects, the obtained background color does not often match other background colors rendered as graphics objects. Upon processing a text command, the background of a character string to be rendered is rendered as a graphics object, and the character string to be rendered is rendered as a text object.

7 Claims, 9 Drawing Sheets

IMAGE PROCESSING APPARATUS AND METHOD

FIELD OF THE INVENTION

The present invention relates to an image processing apparatus and method and, more particularly, to an image processing apparatus and method for executing a rendering process in correspondence with the type of object to be rendered.

BACKGROUND OF THE INVENTION

Recently, as workstations (WS), personal computers (PC), and color printers represented by laser beam printers, ink-jet printers, and the like have prevailed, various color documents created and/or edited by application software can be printed out.

In order to easily obtain a color printout that the user wants, the following problems must be solved.

(1) A monitor such as a CRT or the like on which the user creates/edits a color document has a color reproduction range (gamut) different from that of a printer. In general, the color reproduction range of the monitor is broader than that of the printer, which cannot reproduce all colors expressed by the monitor. For this reason, a compression process (color space matching) of a color space is required, and some color space compression schemes have been proposed. However, it is difficult for the user to select an appropriate one of these schemes.

(2) In connection to (1) above, since the colors on the monitor are expressed by R, G, and B additive primaries, and those of the printers are expressed by C, M, Y, and K subtractive primaries, a color obtained by mixing a plurality of colors confirmed on the monitor may be different from that obtained by the printer.

(3) Recent printers have high resolutions (e.g., 1,200 dpi, 600 dpi), and require a print process of much higher resolution than a preview on the monitor having a resolution as low as about 72 dpi, and appropriate halftoning (binarization, multi-value conversion, quantization, and the like) corresponding to each purpose must be selected.

(4) Electrophotographic printers represented by laser beam printers often have subtly different tinctures due to aging and individual differences of their engines. Some methods of controlling tincture differences have been proposed. However, such methods are effective for given type of object (data) but may cause side effects for another type of object (data).

A color document contains various objects having different features, e.g., text, graphics, images, and the like. For example, text data includes 1-byte alphanumeric characters, 2-byte kanji characters, and the like, and image data has a two-dimensional array of pixels, and has different color information values in units of pixels. Image data is often compressed to attain high efficiency. Graphics data is expressed by lines, polygonal edges, and inner regions.

In order to realize satisfactory color reproduction in a printout, processes for solving the aforementioned problems are required in correspondence with features of individual objects. As an example of such solution, a technique for discriminating the type of object indicated by a rendering command in accordance with the format of the command is known. However, according to this technique, since all text commands issued by application software are rendered as text objects, the balance of a printout may be lost.

For example, a text command is rendered to a character background color. In this case, if all text commands are rendered as text objects, the obtained background color may not often match other background colors rendered as graphics objects. That is, since a color process and halftoning upon printing a text object are different from those upon printing a graphics object, the reproduced tinctures may look different.

When the user instructs to render text commands using a font of a minimal or maximal point size, he or she may have done so to obtain a graphics effect rather than normal legible text. Hence, it is not advisable to identify all text commands as text objects.

Character decorative lines such as an underline, strikeout line, and the like, are normally identified as graphics objects since an application independently renders their commands. For this reason, if a character decorative line designated by a text command is identified as a text object, both character decorative lines as graphics and text objects are mixed, and object handling of character decorative lines becomes inconsistent, resulting in different tinctures.

SUMMARY OF THE INVENTION

The present invention has been made to solve the aforementioned problems, and has as its object to execute a high-quality rendering process that matches user's prospect.

In order to achieve the above object, a preferred embodiment of the present invention discloses an image processing method of determining a type of object to be rendered, and rendering in accordance with the determined type of object, wherein in a command for instructing to render a text object, a type of object of a character string to be rendered is determined as text, and a type of object of a background of the character string to be rendered is determined as graphics.

It is another object of the present invention to execute a high-quality rendering process that can realize consistent color reproduction of character decorative lines.

In order to achieve the above object, a preferred embodiment of the present invention discloses an image processing method of determining a type of object to be rendered, and rendering in accordance with the determined type of object, wherein in a command for instructing to render a text object, a type of object of a character string to be rendered is determined as text, and a type of object of a background of the character string to be rendered is determined as graphics, wherein a type of object of a decorative line to be added to the character string to be rendered is determined as text.

A preferred embodiment of the present invention discloses an image processing method of determining a type of object to be rendered, and rendering in accordance with the determined type of object, wherein in a command for instructing to render a text object, a type of object of a character string to be rendered is determined as text, and a type of object of a background of the character string to be rendered is determined as graphics, wherein a type of object of a decorative line to be added to the character string to be rendered is determined as graphics.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

FIG. 3 is a view for explaining a text command and the like;

DESCRIPTION OF THE PREFERRED EMBODIMENTS

An image processing apparatus according to an embodiment of the present invention will be described in detail hereinafter with reference to the accompanying drawings. In the following description, the present invention is applied to a color printer, but can also be applied to a monochrome printer.

[First Embodiment]
[Arrangement]

Figure 1:
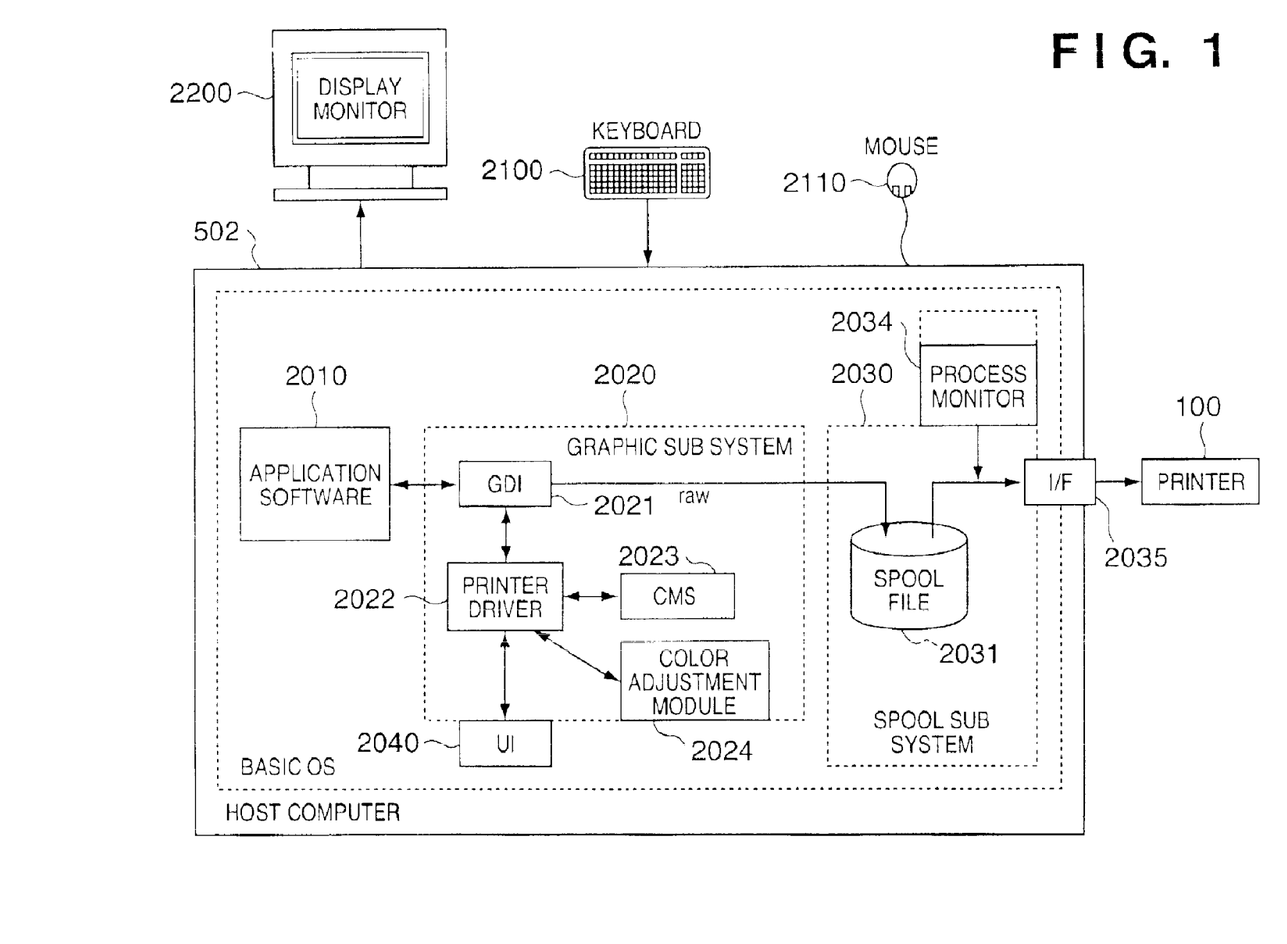
FIG. 1 is a block diagram showing the arrangement of a host computer system according to the first embodiment of the present invention.

FIG. 1 is a block diagram showing the arrangement of a host computer system according to the first embodiment.

Referring to FIG. 1, a host computer 502 outputs print information containing print data and control codes to a printer 100. The host computer 502 is constructed as a computer system that combines a keyboard 2100 as an input device, a mouse 2110 as a pointing device, a display monitor 2200 as a display device, and the like, and a basic operating system (OS) such as Windows® series available from Microsoft Corp. is running on the host computer 502.

Considering only functions that pertain to this embodiment, the host computer 502 is roughly categorized on the basic OS into application software 2010, a graphic sub system 2020 as an image information processing means, a spool sub system 2030, and a user interface processor (UI) 2040.

The graphic sub system 2020 comprises a graphics device interface (GDI) 2021 as one function of the basic OS, and a printer driver 2022 as a device driver dynamically linked from the GDI 2021.

The printer driver 2022 has a major role of converting a command called from the application software 2010 as a GDI rendering command (function) into a page description language (PDL). The printer driver 2022 asks a color management system (CMS) 2023 and color adjustment module 2024 to execute color processes in accordance with the mode designated by the user, and the type of GDI rendering command.

The spool sub system 2030 is located on the output side of the graphic sub system 2020, and is unique to the printer driver. The spool sub system 2030 comprises a spool file 2031 (a hard disk or the like in practice) as a data storage means, and a process monitor 2034 for reading out a PDL code stored in the spool file 2031 to monitor the progress of processes in the printer 100.

The UI 2040 displays various menu buttons and the like on the display monitor 2020 so as to determine control parameters of the print quality while using functions provided by the basic OS, and interprets user actions made via the keyboard 2100 and mouse 2110.

Although the names and functional frameworks of the aforementioned components (modules) differ slightly depending on the basic OS used, the modules need only implement the respective technical means, and the differences in their names and frameworks do not influence this embodiment. For example, the spooler and spool file 2031 and can be implemented by installing a process in a module called a print queue in another OS.

In the host computer 502 including these functional modules, software such as the basic OS or the like controls hardware components including a CPU, ROM, RAM, hard disk drive (HDD), various I/O controllers (I/O), and the like, and processes of the application software 2010 and sub systems serve as function modules under the basic OS.

[Process of Printer Driver]

Figure 2:
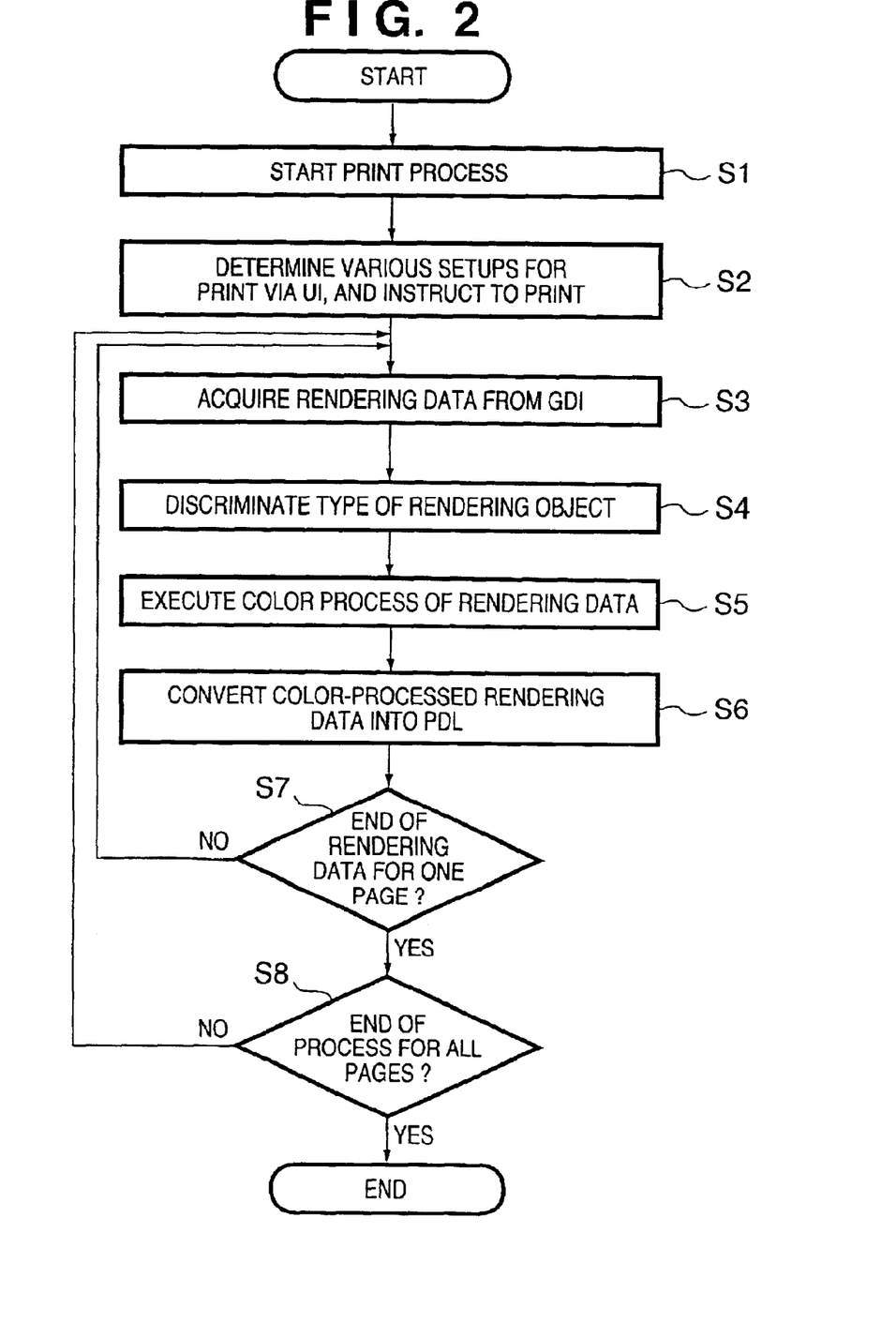
FIG. 2 is a flow chart showing a process executed by a printer driver.

The process executed by the printer driver 2022 will be described below with reference to the flow chart shown in FIG. 2.

When the user instructs to start a print process from given application software 2010 which runs on the host computer 502, the UI 2040 displays a print dialog used to set print control parameters on the display monitor 2200 (S1). The user makes various setups of, e.g., an output printer, recording sheet size, the number of copies to be printed, print quality, and the like, and instructs to print (S2).

Upon issuing the print instruction, rendering data indicating an image created/edited by the application software 2010 is passed to the printer driver 2022 via the GDI 2021 (S3). Upon receiving the rendering data various rendering commands, color parameters, and the like, the printer driver 2022 checks based on a GDI function if the type of rendering object of interest is text, image, or graphics (S4). The printer driver 2022 controls the CMS 2023 and color adjustment module 2024 to execute color processes such as color adjustment, color matching, and the like in accordance with the control parameters set in step S2 in correspondence with the type of rendering object (S5), and converts the rendering data that has undergone the color processes into a PDL code (S6).

The printer driver 2022 repeats the processes in steps S4 to S6 until it is determined in step S7 that a rendering data process for one page is complete, and repeats the processes in steps S3 to S7 until it is determined in step S8 that processes for all pages are complete.

The sequence for processing a text command in step S4 will be explained below.

A test command is a function implemented in the printer driver 2022, and is implemented as a function named ExtTextOut in Windows® 98/95/3.1, and as a function named DrvTextOut in Windows® NT/Windows® 2000.

Figure 3:
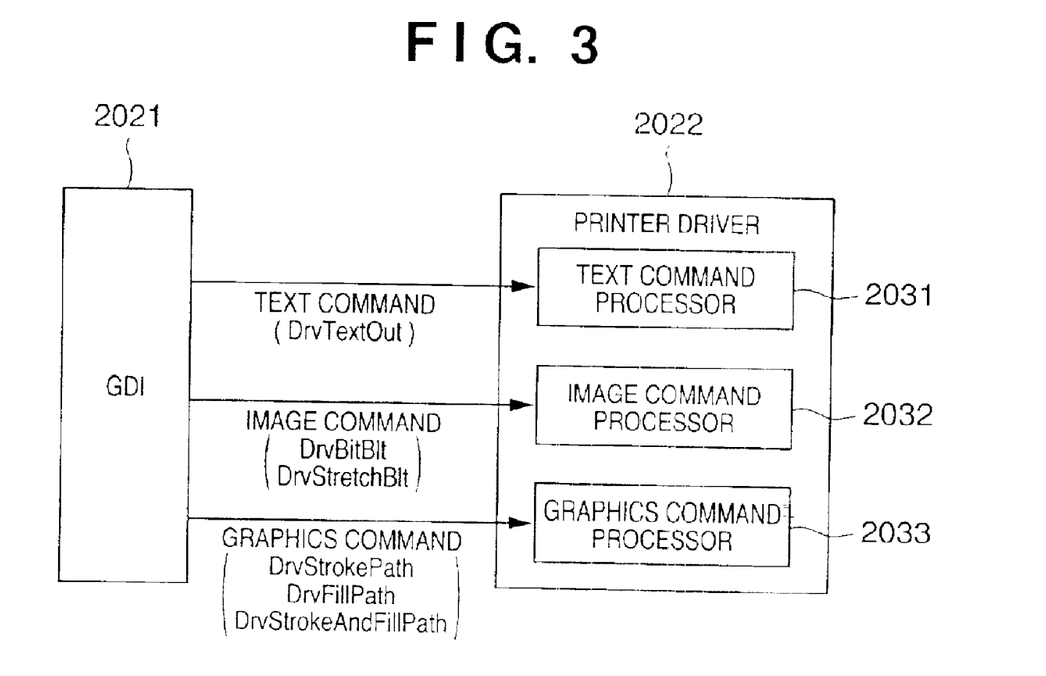

Starting a text command is to call an internal function of the printer driver 2022 by the GDI 2021, and FIG. 3 shows this state. That is, when the GDI 2021 calls a text command (DrvTextOut function), a command processor 2031 of the printer driver 2022 corresponding to DrvTextOut renders text. Likewise, when an image command (DrvBitBlt function or DrvStretchBlt function) is called, an image command processor 2032 corresponding to such function renders; when a graphics command (DrvStrokePath function, DrvFillPath function, or DrvStrokeAndFillPath function) is called, a graphics command processor 2033 corresponding such function renders.

Note that the DrvTextOut function is called as follows. Only principal parameters will be introduced below.

DrvTextOut (p1, p2, p3, p4, p5, p6)

parameter p1: variable name that stores character string information contains character string parameter p2: variable name that stores font information contains character size parameter p3: variable name that stores character decorative region no decorative line if p3=NULL parameter p4: variable name that stores character background region character background is transparent if p4=NULL parameter p5: variable name that stores character color parameter p6: variable name that stores character background color.

For example, when a text object "is flower blooming?" stored in variable string is rendered as 12-point white, italic, underlined characters with blue background, DrvTextOut is called. At this time, a variable designated by parameter p1 stores a character string "is flower blooming?", a variable designated by parameter p2 stores character size information indicating 12 points and italic information, a variable designated by parameter p3 stores information of an underline shape, a variable designated by parameter p4 stores a character background region, a variable designated by parameter p5 stores white (R=255, G=255, B=255), and a variable designated by parameter p6 stores blue (R=0, G=0, B=255).

Figure 4:
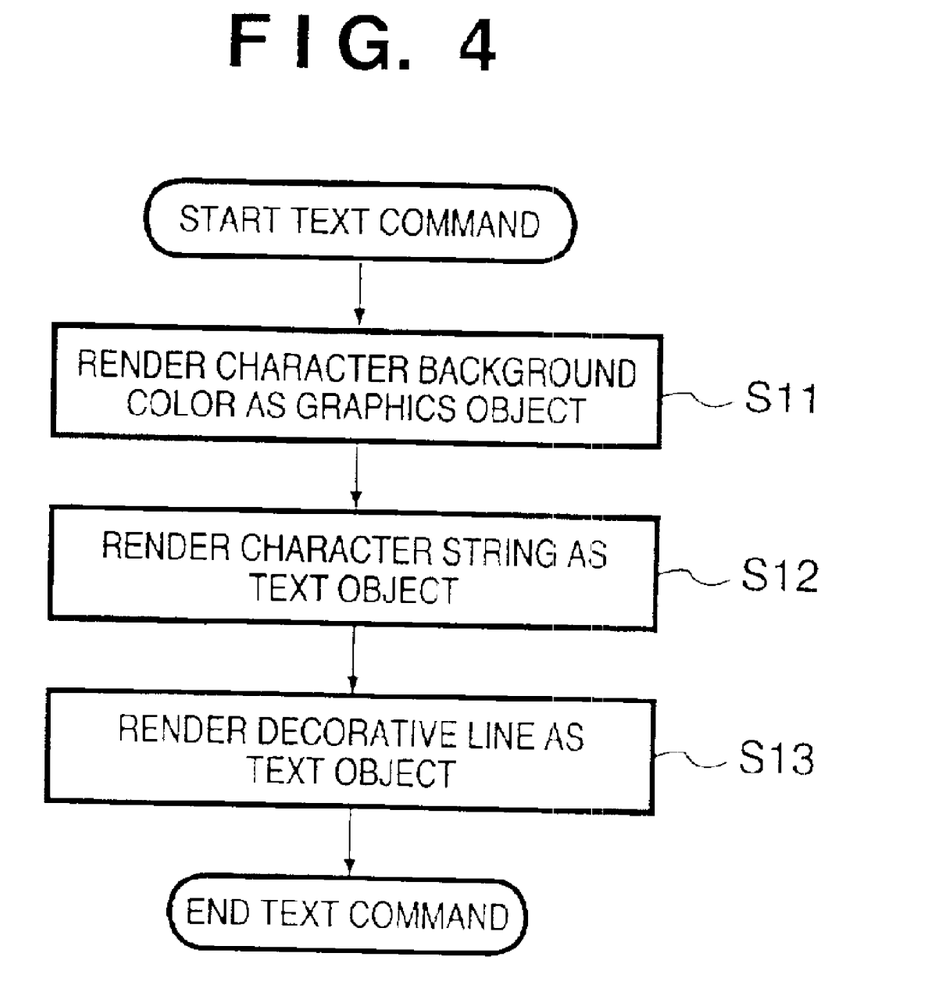
FIG. 4 is a flow chart showing the sequence for processing a text command.

FIG. 4 is a flow chart showing an example of the sequence for processing a text command in step S4.

If a character background color must be rendered, it is rendered as a graphics object (S11). Then, a character string is rendered as a text object in accordance with respective parameters (S12). After the character string is rendered, a decorative line such as an underline, strikeout line, or the like is rendered as a text object (S13), thus ending the text command.

As described above, according to the first embodiment, when a text command designates rendering of a character background color, rendering is executed while handling the background color as a graphics object. Therefore, the problem that the tincture of the obtained background color does not match that of another background color rendered as a graphics object can be easily avoided. Hence, a high-quality rendering process that matches user's prospect can be done.

[Second Embodiment]

An image processing apparatus according to the second embodiment of the present invention will be described below. Note that the same reference numerals in the second embodiment denote the same parts as those in the first embodiment, and a detailed description thereof will be omitted.

Figure 5:
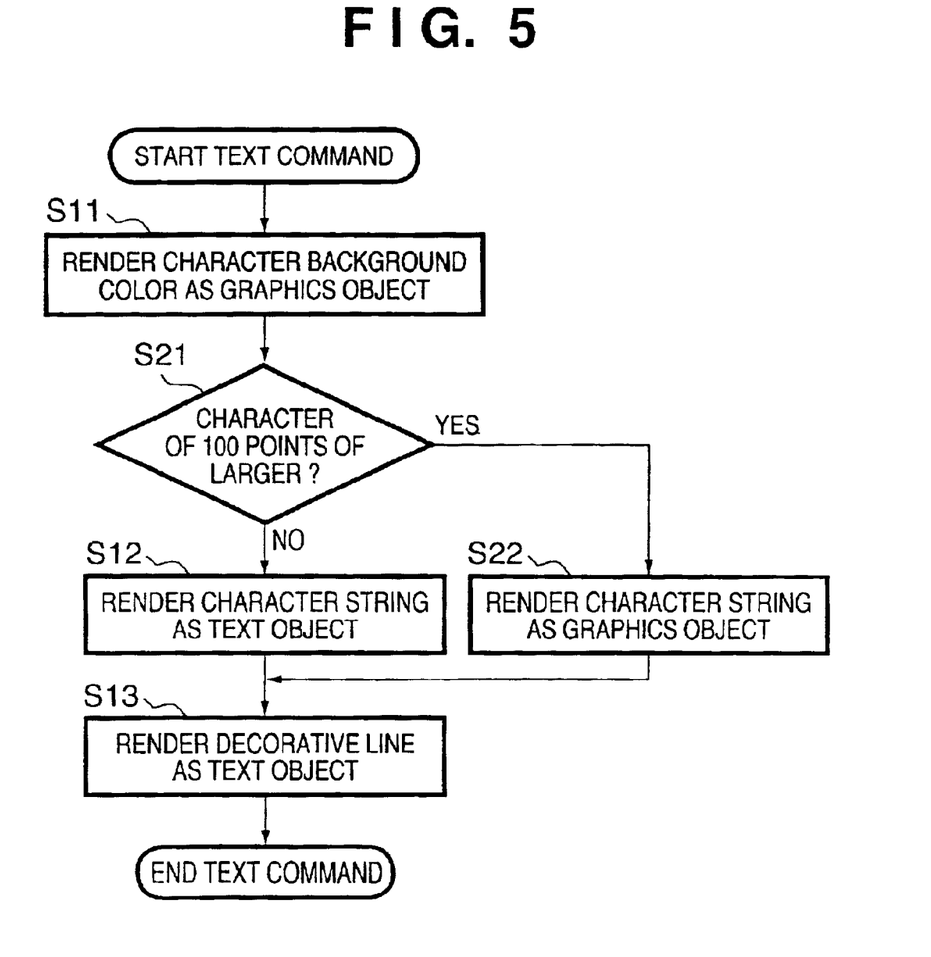
FIG. 5 is a flow chart showing the sequence for processing a text command according to the second embodiment of the present invention.

FIG. 5 is a flow chart showing the sequence for processing a text command in step S4 according to the second embodiment. In this flow chart, steps S21 and S22 are added to the process in the first embodiment shown in FIG. 4.

Figure 6:
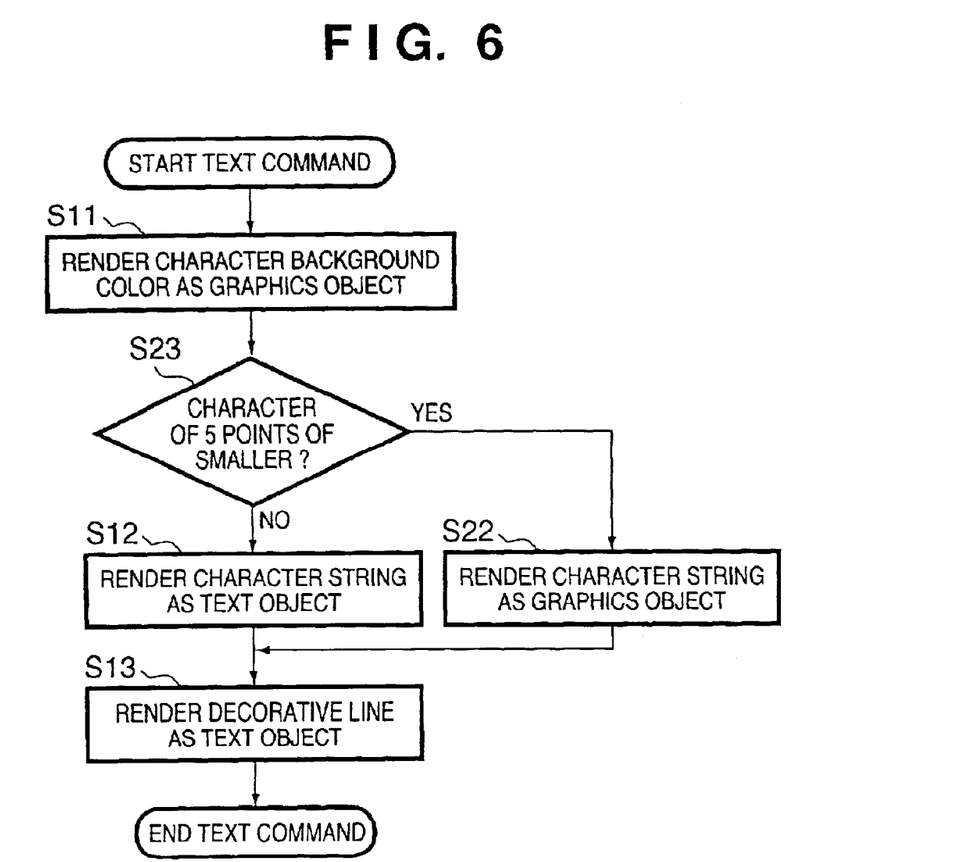
FIG. 6 is a flow chart showing the second sequence for processing a text command according to the second embodiment of the present invention.

The printer driver 2022 checks based on a text command if a character having a size of 100 points or larger is to be rendered (S21). If NO in step S21, a character string is rendered as a text object (S12) as in the first embodiment; if YES in step S21, a character string is rendered as a graphics object (S22). FIG. 6 is a flow chart showing the second sequence for processing a text command in step S4 according to the second embodiment. In this flow chart, steps S23 and S22 are added to the process in the first embodiment shown in FIG. 4.

The printer driver 2022 checks based on a text command if a character having a size of 5 points or smaller is to be rendered (S23). If NO in step S23, a character string is rendered as a text object (S12) as in the first embodiment; if YES in step S23, a character string is rendered as a graphics object (S22).

Figure 7:
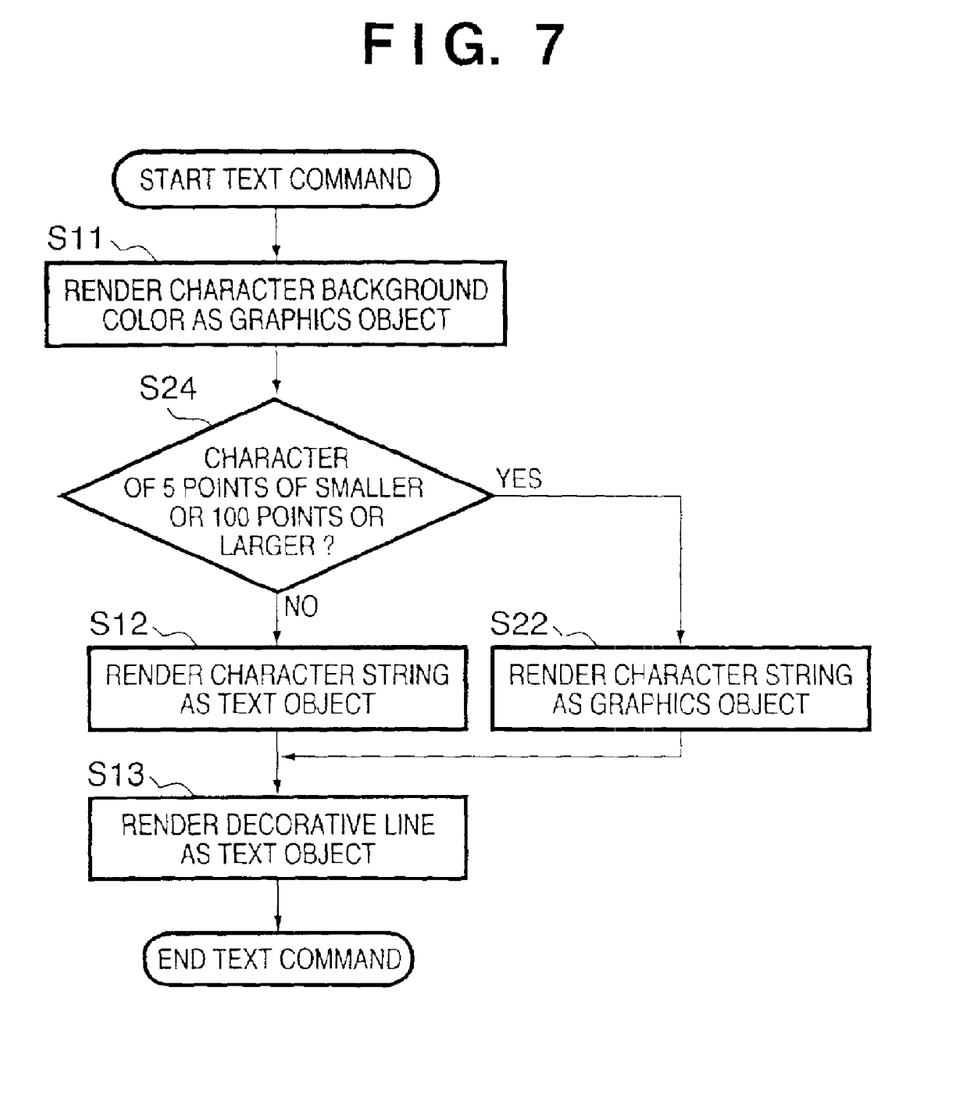
FIG. 7 is a flow chart showing the third sequence for processing a text command according to the second embodiment of the present invention.

FIG. 7 is a flow chart showing the third sequence for processing a text command in step S4 according to the second embodiment, and combines the sequences shown in FIGS. 5 and 6.

The printer driver 2022 checks based on a text command if a character having a size of 5 points or smaller or 100 points or larger is to be rendered (S24). If NO in step S24, a character string is rendered as a text object (S12) as in the first embodiment; if YES in step S24, a character string is rendered as a graphics object (S22).

In the processes shown in FIGS. 5 to 7, threshold values used to determine if a character string is processed as a text or graphics object are not limited to 5 points and 100 points, but can be other appropriate sizes. Alternatively, the user may set these threshold values via the UI 2040 in step S2.

As described above, according to the second embodiment, the same effect as in the first embodiment can be obtained, and when the user instructs to print text using a font of a minimal point size and/or maximal point size, the system determines that he or she has done so to obtain a graphics effect rather than normal readable text, and renders that text as a graphics object. Hence, a high-quality rendering process that matches user's prospect can be done.

[Third Embodiment]

Figure 8:
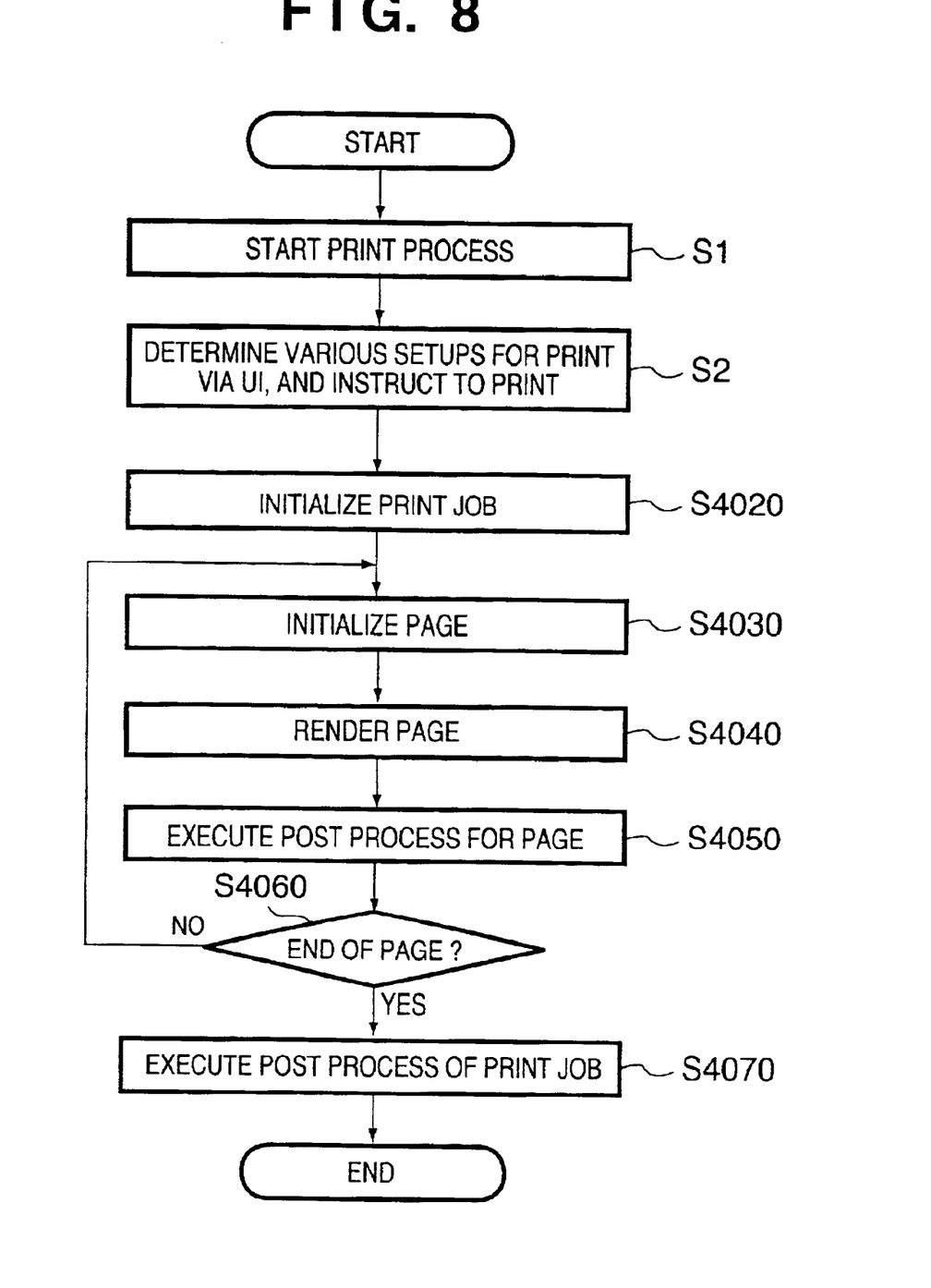
FIG. 8 is a flow chart showing a print process executed by a printer driver according to the third embodiment of the present invention.

A process executed by the printer driver 2022 according to the third embodiment of the present invention will be described below with reference to the flow chart shown in FIG. 8. Note that the same step numbers denote the same processes as those in FIG. 2, and a detailed description thereof will be omitted.

When a print instruction is issued, rendering data indicating an image created/edited by the application software 2010 is passed as a print job to the printer driver 2022 via the GDI 2021, and the printer driver 2022 initializes the print job (S4020).

The printer driver 2022 then initializes the print job in units of pages (S4030), and renders a page (S4040). This rendering process will be described in detail later.

After rendering in units of pages, a post process such as a new page process or the like is executed (S4050). If a page to be printed still remains in step S4060, the flow returns to step S4030 to process the next page; otherwise, the flow advances to step S4070, and a post process of the print job is executed, thus ending the print process.

The rendering process in step S4040 will be described below with reference to FIG. 3. FIG. 3 shows an interface of rendering commands (text command, image command, and graphics command) between the GDI 2021 and printer driver 2022.

Note that a text command is to call an internal function of the printer driver 2022 by the GDI 2021. That is, when the GDI 2021 calls a text command (DrvTextOut function), the command processor 2031 of the printer driver 2022 corresponding to DrvTextOut renders text.

Like the text command, an image command is to call by the GDI 2021 an image processing function (DrvCopyBits, DrvBitBlt, or DrvStretchBlt function) implemented in the printer driver 2022, and a graphics command is to call a graphics processing function (DrvStrokePath function, DrvFillPath function, or DrvStrokeAndFillPath function) implemented in the printer driver 2022.

The printer driver 2022 executes color adjustment and color matching in correspondence with the types of rendering objects corresponding to such commands. Color information that has undergone color matching is converted into a PDL code, thus executing the rendering process.

Figure 9:
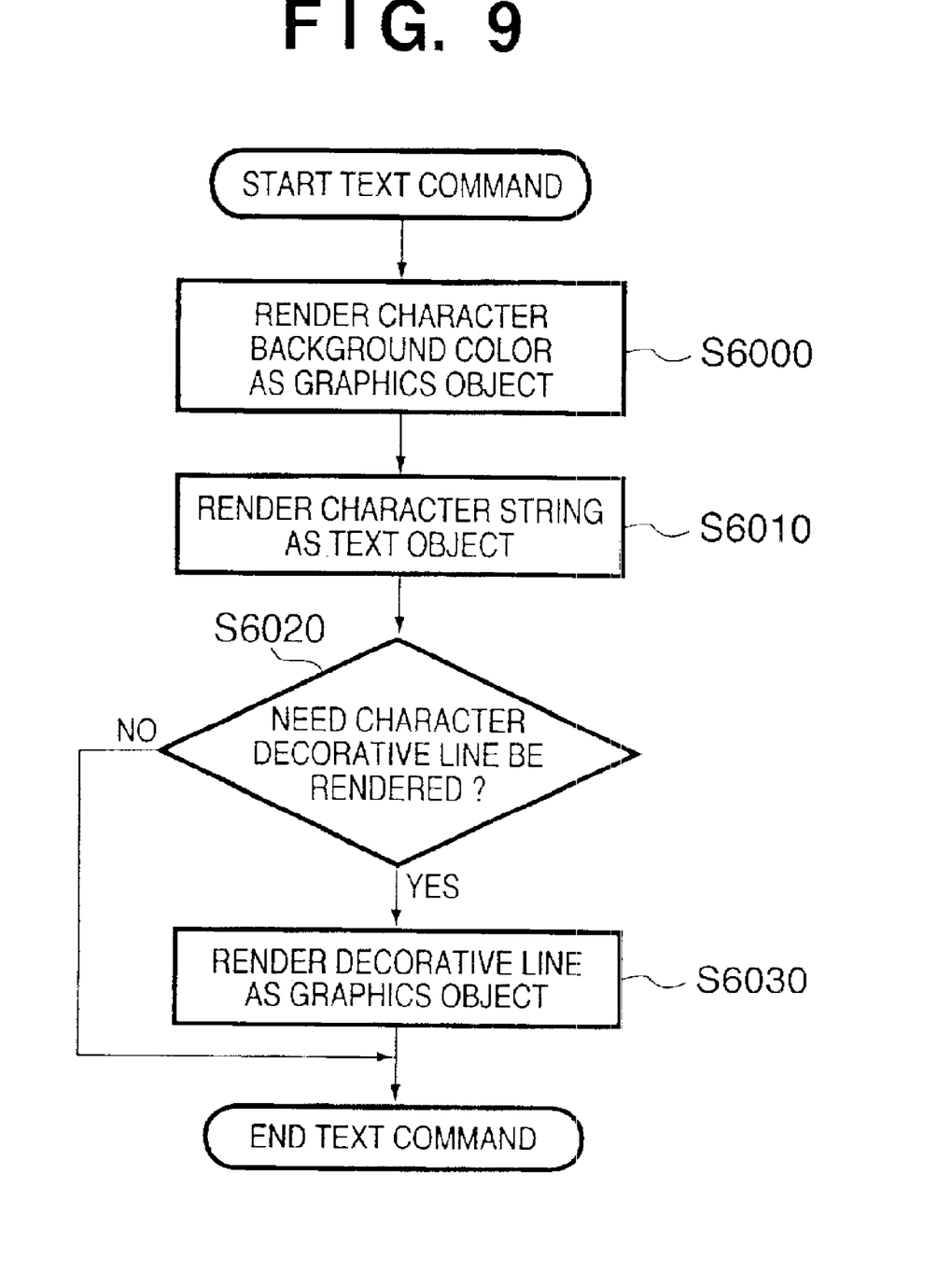
FIG. 9 is a flow chart showing a text command process according to the third embodiment of the present invention.

The rendering process of a text command in step S4040 will be described in detail below with reference to the flow chart in FIG. 9.

If a character background color must be rendered, it is rendered as a graphics object (S6000). Then, a character string is rendered as a text object (S6010). After that, it is checked if a character decorative line such as an underline, strikeout line, or the like must be rendered (S6020). If YES in step S6020, the character decorative line is rendered as a graphics object (S6030).

As described above, according to the third embodiment, since a character decorative line designated by a text command is rendered not as a text object but as a graphics object, it can be processed in the same manner as a character decorative line designated by another graphics command. Hence, object control for the character decorative line becomes easy, thus allowing consistent color reproduction.

As many apparently widely different embodiments of the present invention can be made without departing from the spirit and scope thereof, it is to be understood that the invention is not limited to the specific embodiments thereof except as defined in the appended claims.

What is claimed is:

1. An image processing method comprising the steps of:
   inputting a rendering command which indicates an object to be rendered;
   discriminating a property of the object by analyzing the rendering command; and
   rendering the object after a color process, which corresponds to a result of the discrimination, has been performed,
   wherein the object includes a graphics object and a text object and the rendering command for the text object includes information which represents a character string, a character color parameter of the character string and a background color parameter of the character string, and
   wherein the color process for graphics is performed on the graphics object by a graphics coloring process and the color process for graphics is performed on a background color of the character string by the graphics coloring process using the background color parameter, and the color process for text is performed on a character color of the character string by a text coloring process using the character color parameter.

2. The method according to claim 1, the rendering command for the text object further includes a character size information, and the color process for graphics is performed on the character color of the character string by a graphics coloring process using the character color parameter when the character size information indicates a predetermined size.

3. An image processing method comprising the steps of:
   inputting a rendering command which indicates an object to be rendered;
   discriminating a property of the object by analyzing the rendering command; and
   rendering the object after a color process, which corresponds to a result of the discrimination, has been performed,
   wherein the object includes a graphics object and a text object and the rendering command for the text object includes information which represents a character string, a character color parameter of the character string and a decoration parameter of the character string, and
   wherein the color process for graphics is performed on the graphics object by a graphics coloring process and the color process for graphics is performed on a decoration of the character string by the graphics coloring process using the decoration parameter, and the color process for text is performed on a character color of the character string by a text coloring process using the character string parameter.

4. A computer program product comprising a computer readable medium having a computer program code, for an image processing method, comprising process procedure code for:
   discriminating a property of the object by analyzing the rendering command; and
   rendering the object after a color process, which corresponds to a result of the discrimination, has been performed,
   wherein the object includes a graphics object and a text object and the rendering command for the text object includes information which represents a character string, a character color parameter of the character string and a background color parameter of the character string, and
   wherein the color process for graphics is performed on the graphics object by a graphics coloring process and the color process for graphics is performed on a background color of the character string by the graphics coloring process using the background color parameter, and the color process for text is performed on a character color of the character string by a text coloring process using the character color parameter.

5. A computer program product comprising a computer readable medium having a computer program code, for an image processing method, comprising process procedure code for:
   inputting a rendering command which indicates an object to be rendered;
   discriminating a property of the object by analyzing the rendering command; and
   rendering the object after a color process, which corresponds to a result of the discrimination, has been performed,
   wherein the object includes a graphics object and a text object and the rendering command for the text object includes information which represents a character string, a character color parameter of the character string and a decoration parameter of the character string, and
   wherein the color process for graphics is performed on the graphics object by a graphics coloring process and the color process for graphics is performed on a decoration of the character string by the graphics coloring process using the decoration parameter, and the color process for text is performed on a character color of the character string by a text coloring process using the character color parameter.

6. An image processing apparatus, comprising:
   an inputting section, arranged to input a rendering command which indicates an object to be rendered;
   a discriminator, arranged to discriminate a property of the object by analyzing the rendering command;

a processor, arranged to perform a color process, which corresponds to a result of the discrimination, on the object; and a rendering section, arranged to render the object subjected to the color process, wherein the object includes a graphics object and a text object and the rendering command for the text object includes information which represents a character string, a character color parameter of the character string and a background color parameter of the character string, and wherein the color process for graphics is performed on the graphics object by a graphics coloring process and the color process for graphics is performed on a background color of the character string by the graphics coloring process using the background color parameter, and the color process for text is performed on a character color of the character string by a text coloring process using the character color parameter.

7. An image processing apparatus, comprising:

an inputting section, arranged to input a rendering command which indicates an object to be rendered;

a discriminator, arranged to discriminate a property of the object by analyzing the rendering command;

a processor, arranged to perform a color process, which corresponds to a result of the discrimination, on the object; and a rendering section, arranged to render the object subjected to the color process, wherein the object includes a graphics object and a text object and the rendering command for the text object includes information which represents a character string, a character color parameter of the character string and decoration parameter of the character string, and wherein the color process for graphics is performed on the graphics object by a graphics coloring process and the color process for graphics is performed on a decoration of the character string by a graphics coloring process using the decoration parameter, and the color process for text is performed on a character color of the character string by a text coloring process using the character color parameter.

* * * * *